Sept. 20, 1971    W. HAACK    3,605,489
DYNAMOMETER FOR MEASURING FORCE, IN PARTICULAR A BEAM BALANCE
Filed Dec. 12, 1969    4 Sheets-Sheet 1

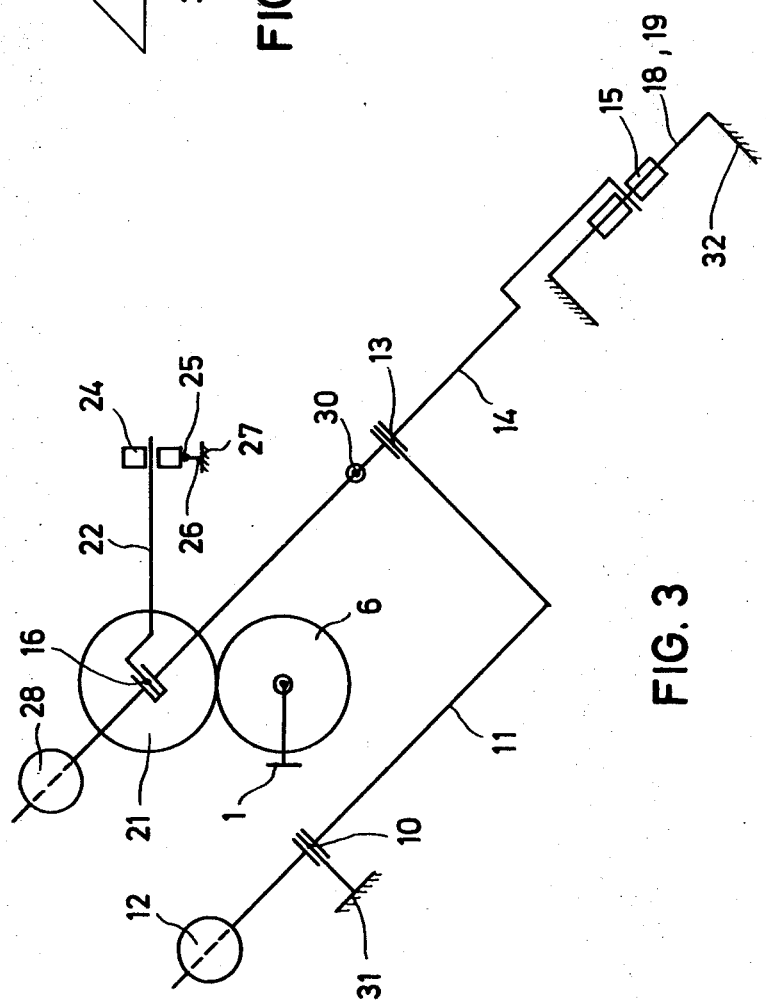

United States Patent Office 3,605,489
Patented Sept. 20, 1971

3,605,489
DYNAMOMETER FOR MEASURING FORCE, IN PARTICULAR A BEAM BALANCE
Werner Haack, Bondastrasse 83,
CH-7000 Chur, Switzerland
Filed Dec. 12, 1969, Ser. No. 884,579
Claims priority, application Germany, Dec. 12, 1968,
P 18 14 161.2
Int. Cl. G01l 1/08
U.S. Cl. 73—141R 11 Claims

ABSTRACT OF THE DISCLOSURE

A dynamometer comprising a beam balance having a motor-driven friction roller and a friction wheel in contact therewith, the wheel bearing via a guide bar against a rail extending parallel to the axis of the friction roller so that when a load is applied to the dynamometer the friction wheel is axially and linearly displaced with respect to the friction roller until a new point of balance is reached. The parallel motion of the friction wheel alongside the friction roller is achieved by means of a drive mechanism consisting of articulated levers.

BRIEF SUMMARY OF THE INVENTION

This invention relates to a dynamometers and more particularly to a balance beam for measuring static and dynamic loads.

A dynamometer in the form of a balance beam is known wherein a motor-driven friction drive is used to adjust the rider or balance weight, at least one friction member of said drive being in contact with a second friction member which is deflectable and displaceable with respect to said first member depending on the applied load. In the case of this known balance beam, guide rails are located adjacent the friction roller upon which travels a trolley supporting the second friction member. The guide rails and rollers of this trolley have to be manufactured to a high precision and nevertheless the rolling resistance opposed to the displacement of the frictional member is large. The balance beam is highly sensitive to dust and dirt since even the smallest dust particles on the running rails upset the accuracy of measurement.

An object of the present invention is to provide a dynamometer measuring device based on the foregoing known balance beam, which is simpler and cheaper to manufacture, is capable of greater accuracy because it is not affected by dust and in which, above all, the total resistance opposing the movement of the balancing weight or rider is reduced to a fraction of that of the aforesaid known balance beam.

Attempts have been made to solve this problem in the case of the aforesaid known automatic dynamometer by mounting at least one of the two friction-driven members on an articulated link motion gear with the object of producing an approximately linear translational movement.

The apparatus of the present invention, on the other hand, avoids setting up any rolling resistance as in the known construction. Instead, it is only necessary to deal with the considerably smaller resistance to angular displacement at the various bearing points of the oscillating beam. Since the angular displacement takes place via long lever arms, the total resistance that has to be overcome in order to move the rider or balancing weight is reduced to a fraction of that of a rolling weight. In this way a larger proportion of the thrust generated from the friction drive becomes available for operating and guiding ancillary devices such as weight indicators over a scale. The power required to operate such ancillary devices is advantageously applied coaxially to the axis of rotation of the friction wheel, in order to prevent any disturbing moments derived from various external resistances from being transmitted to the guide bar of the friction wheel.

The invention avoids the use of any precision-made costly functional members, such as running rails and trolleys with rollers. Use is made instead of two very simple levers with commercial grade ball bearings. The total cost of achieving linear motion of the friction wheel is considerably less than that of the above known device. Moreover, assembly is much simpler because all parts can be of more solid construction and buckling and distortion of small precision-made parts liable to occur with the previous apparatus is rendered impossible. Immunity to dust is very advantageous since whereas with the known apparatus even the smallest dust particles can upset measurement accuracy, it is impossible with the present apparatus for dust to interfere with the spacing of the working axles.

BRIEF DESCRIPTION OF THE DRAWING

In order more clearly to understand the invention, reference will be made to the accompanying drawing, which illustrates diagrammatically and by way of example, two embodiments thereof, in which:

FIG. 3 is a diagrammatic sectional view similar to that of FIG. 2, but of a spatially tilted lever system, FIG. 4 is a vector diagram of the displacements of the friction wheel arrangement according to FIG. 3.

DETAILED DESCRIPTION

Figures 1, 2:
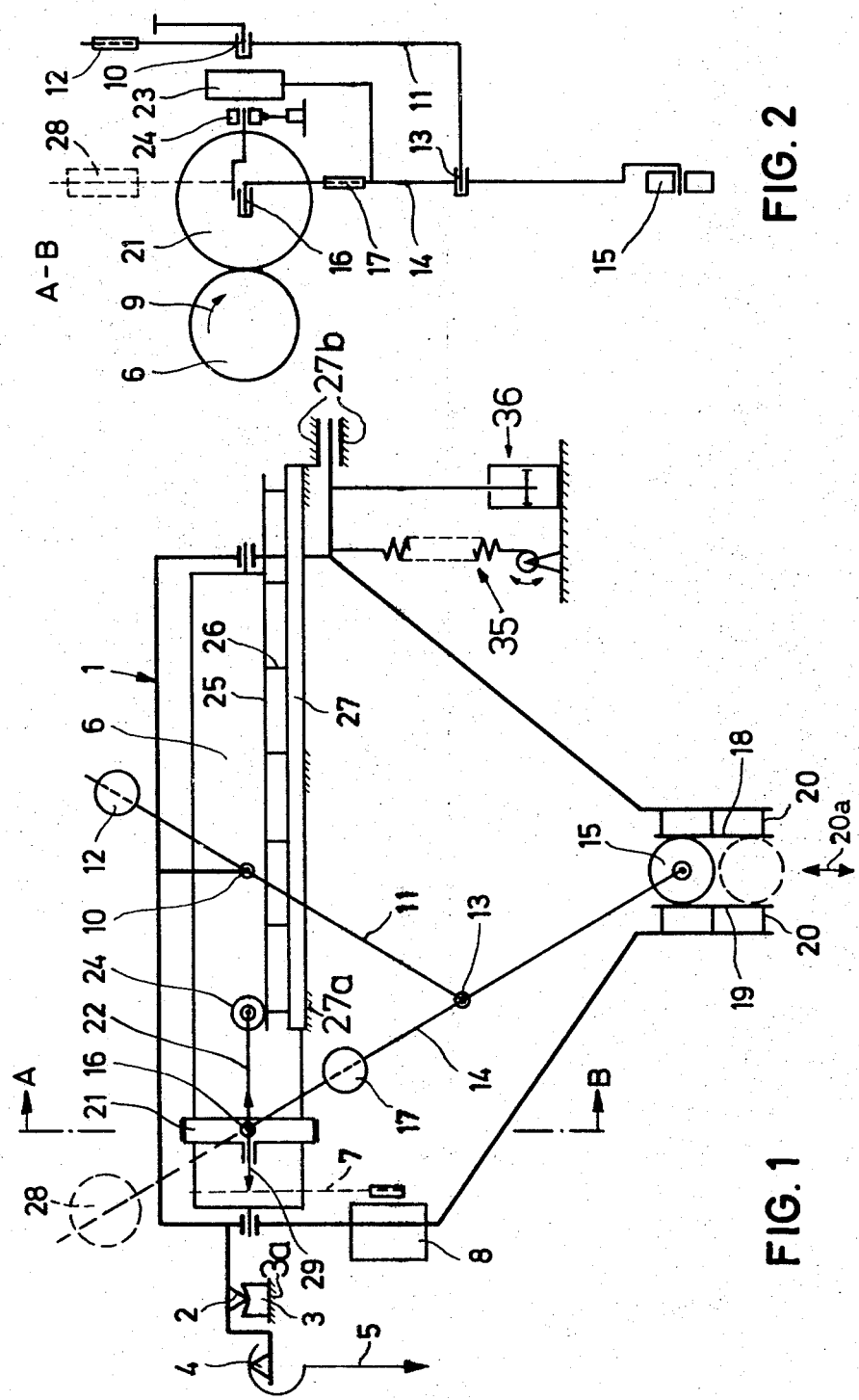
FIG. 1 is a diagrammatic elevation view of a dynamometer in the form of a balance beam.
FIG. 2 is a diagrammatic sectional view taken along the line A–B of FIG. 1.

FIG. 1 of the drawing depicted a balance beam 1, having a knife edge 2 mounted on a rest 3 fixed to a foundation 3a. The balance beam is loaded at a knife edge 4, by means of which the unknown weight or the force to be measured, is applied to the balance beam. A cylindrical roller 6 is mounted in the balance beam so as to be freely rotatable and the roller 6 is driven, in this particular case, in rotation through a belt 7 by an electric motor 8. The roller rotates continuously during the weighing or measuring operation, the direction of rotation being indicated by the arrow 9 in FIGS. 2 and 5.

A substantially horizontal axle 10 is rigidly connected to the balance beam 1, and the axle 10 extends at right angles to the axis of the roller 6 along a line which intersects such axis.

The axle 10 serves as a mounting for a system of levers to be described hereafter and operating in a vertical plane owing to the horizontal orientation of said axle.

A lever 11 is mounted so as to be freely swingable about axle 10. Lever 11 carries a counter weight 12. An axle 13 parallel to the axle 10, is mounted on the end of lever 11 opposite the counterweight 12. A second lever 14 is mounted so as to be freely swingable about axle 13. A guide roller 15 is rotatably mounted at one end of lever 14, and the other end of lever 14 terminates in an axle 16 which again is parallel to axles 10 and 13. Lever 14 is balanced by a counterweight 17 so that its resultant center of gravity lies on the axle 13. If necessary, lever 14 can be extended and the counterweight can be positioned as shown at 28 in dotted lines in FIG. 1. The system of levers 11, 14 is assembled and the counterweight 12 is adjusted so that the center of gravity of the lever system 11, 14 is situated on the axle 10, with the result that said system will always tend to remain stationary in any angular position.

The roller 15 is guided between vertical guide rails 18, 19 in the direction of the arrow 20a. These guide rails are secured to the frame of the balance beam 1 by means of adjusting screws 20.

If the spacing between axles 10 and 13, between axle 13 and the axis of roller 15 and between axles 13 and 16 are made equal, then when such a lever system is caused to tilt with respect to the frame of balance beam 1 the result is that axle 16 moves along an absolutely straight path, in this case parallel to roller 6. On account of this linearity, which coincides with the horizontal in the case of a weighing beam, control members having inertia, e.g. friction wheel 21 and control arm 22 having to some extent the same effect, can be mounted on axle 16 without affecting the ability of the lever system to remain stationary in any angular position. The mode of operation of the lever system thus remains independent of the magnitude of any additional weights acting on axle 16, such as for example friction wheel 21, a portion of the weight of control arm 22 and even special weight 23 (FIG. 2). Since these weights are not balanced out, they remain freely effective and can be used as riders for weighing and measuring purposes. The device according to the invention possesses the decisive advantage that at all points where the system is balanced, the friction wheel 21 is not preloaded by any horizontally acting force. Such preloading would have the effect of introducing the frictional coefficient of the friction drive as a factor in the measured reading, thus making the accuracy of measurement dependent on the constancy of the frictional coefficient.

The wheel 21 is mounted on the control arm 22, which carries a roller 24 which in turn runs on a guide rail 25 fixed by adjusting screws 26 to a bar 27, the latter being supported on the foundation 27a, 27b. Alternatively, the guide rail may be suspended. The provision for adjusting the rail 25 by means of adjusting screws 26 and for adjusting guide rails 18, 19 by means of screws 20 is very useful in the final adjustment and levelling of the balance. The foundation section 27b also serves as a stop for the beam 1. A device 35 serves to adjust the preloading of the beam 1, while 36 is a dashpot device.

Instead of balancing the lever 14 by means of the weight 17 and of later achieving total balance by adjustment of the weight 12, it is possible to proceed in the following manner:

The lever 14 is not balanced on the axle 13, but on the contrary, directly on the axle 16. The weight 17 is dispensed with. If necessary, the lever 14 is extended out beyond the axle 16 and is provided with counterweight 28, as shown in broken lines in FIGS. 1 and 5. The entire lever masses of the lever 14 are now balancing-masses which are effective at 16.

The optional additional weight (23) (FIG. 2) at any rate can be kept smaller than is the case in the first suggested balancing; possibly it even may be dispensed with. Then the lever 11 alone is balanced, about the axle 10. This balancing is also retained, even after the assembly.

If now the weight is changed at 5, the balance beam 1 pivots, for which reason the stationarily supported control arm 22 brings about a pivoting of the friction wheel 21 in relation to the roller 6. Thus by the rotation of the roller 6, an axially acting adjusting force is exerted upon the friction wheel, a consequence of which is to cause displacement of the friction wheel, in the direction of arrow 29 or opposite thereto in accordance with the direction of the weight change, until a balanced condtion is restored. The lever system 11, 14 is responsible for the axial displacement in a linear path of the friction wheel.

The invention has been described with reference to FIGS. 1, 2 and 5, in respect of a lever system working in a substantially vertical plane, in which the friction wheel runs alongside the roller. The invention is not however restricted to a vertical lever system, but is fundamentally applicable also with a lever system working in any desired tilted position or plane, including the horizontal position. Working in a tilted position or plane can easily be achieved by tilting all the members shown in FIG. 2, apart from the roller 6. In such case the friction wheel works along a new line of contact with the roller depending on the angle of tilt. The extent of the variations which can thus be made in the operation of such a lever system will be discussed with reference to FIG. 3 of the drawings. In this case the friction wheel runs along the top of the roller, and this has the advantage that the rider weight also provides the necessary application pressure between the friction members.

The arrangement for supporting and applying the load to the beam frame and for mounting and rotating the roller 6 are the same as in the embodiment of FIG. 1. The friction wheel 21 operates above the roller 6, and its function together with members 16 and 22–27 corresponds to the function described with reference to FIG. 1.

The difficulty of producing from vertical deflections of the balance beam displacement of the friction wheel about an axis at right angles (since only in this way can longitudinal displacement of the friction wheel be obtained) can be obviated by a tilted lever system. From the tilted position shown in FIG. 3 it will be seen that friction wheel 21 has been pivoted about the axis 16. This pivoted movement can be resolved, as shown vectorially in FIG. 4, into the desired effective deflection 33 along the vertical axis and a superfluous deflection 34 of the balance beam in its horizontal balanced state. The prescribed function of the friction drive is thus achieved. It is now merely necessary also that the lever system should displace the friction wheel along a path as rectilinear as possible as described with reference to FIG. 1. For this purpose, the working plane of the lever system is located at right angles to axle 16. Advantageously an additional joint 30 is provided in lever 14, in order to improve the uniformity of the application pressure between the friction members. The function and also the balancing of lever 14 is not affected by this joint. In this embodiment the axle 10 is fixed to foundation 31 and the guide rails 18, 19 are fixed to foundation 32. Although this rigid fixing to the foundation according to FIG. 3 is simple, it does entail drawbacks in respect of accuracy of measurement to the extent that any displacement of the fundation can be transmitted to the measuring system, causing the latter to be affected by non-uniform rotational resistance of the friction wheel. These drawbacks are avoided when the supports 10, 18–19 are not rigidly secured to the foundation but are connected to the beam frame 1 as shown in FIGS. 1 and 2.

The type of mounting of the lever system depends on the object to be achieved and on the required degree of accuracy of measurement. If a reduced accuracy is sufficient, the lever system can be simplified, for example, by replacing the guide rails 18, 19, axle 10 and roller 15 by a coupling rod (not shown). This coupling rod may be fixed to the foundation or to the weighing beam by an arrangement wherein the flexible joint between lever 14 and the coupling rod moves through a curved path, for example, a circular arc, which if the coupling rod is long enough, almost approximates the required exact linear path.

Moreover the lever system 11, 14 may be designed to operate on one side only of the axle 10 (FIG. 1) i.e. to left or right only thereof; this for example enables one of the guide rails 18, 19 to be dispensed with and results in a simplification of thed esign of the whole measuring apparatus.

FIG. 3 shows that the lever mechanism for approximate or precise linear rider displacement (depending on the required degree of accuracy of measurement) can work in any spatial orientation. It is therefore possible to adapt it completely to the space that may be available. If the weighing space is particularly deficient in head room, the working plane of the lever system can be horizontal or approximately so.

Figure 5:
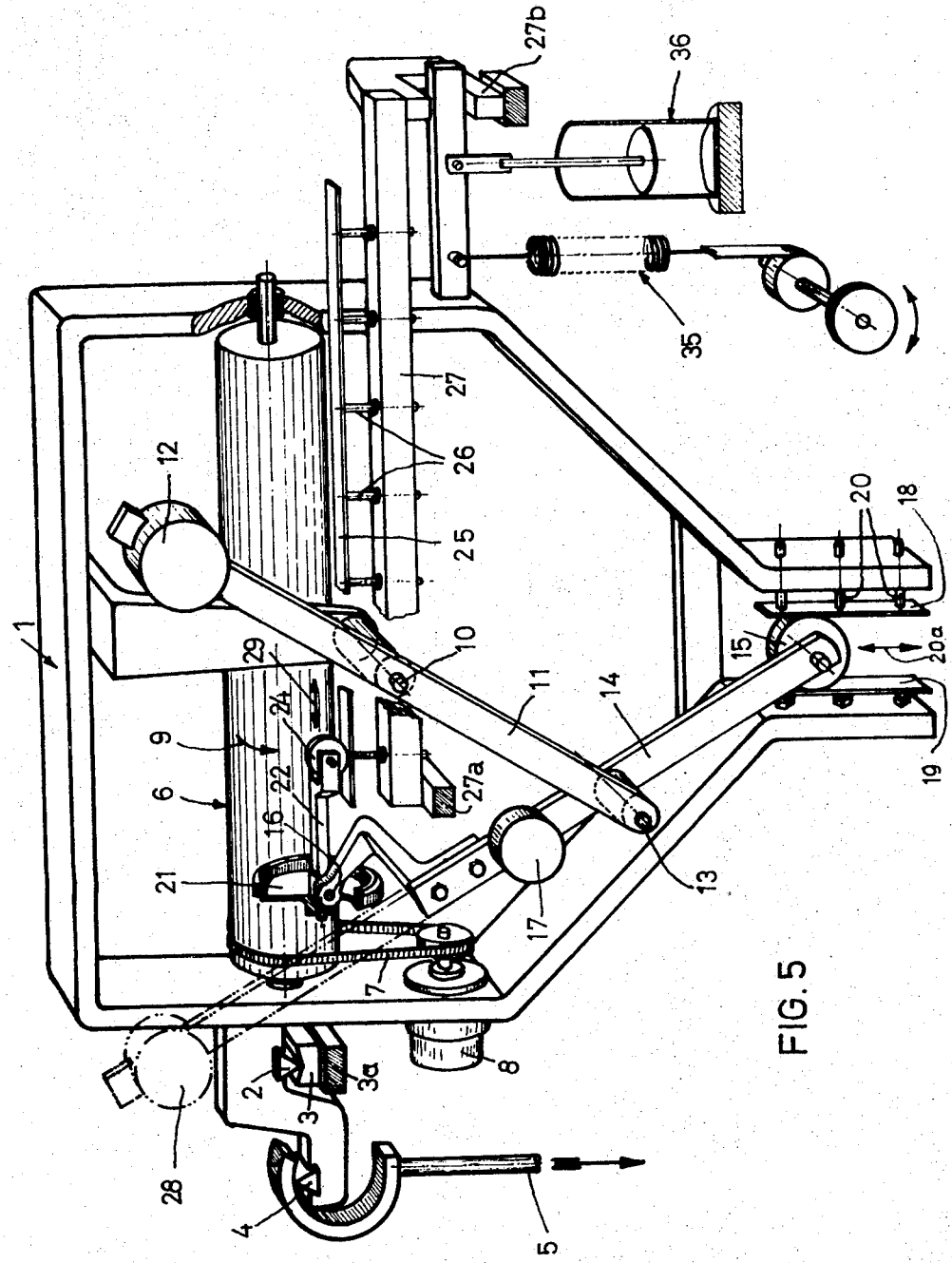
FIG. 5 is a perspective view of the balance beam shown in FIGS. 1 and 2.
Figure 6:
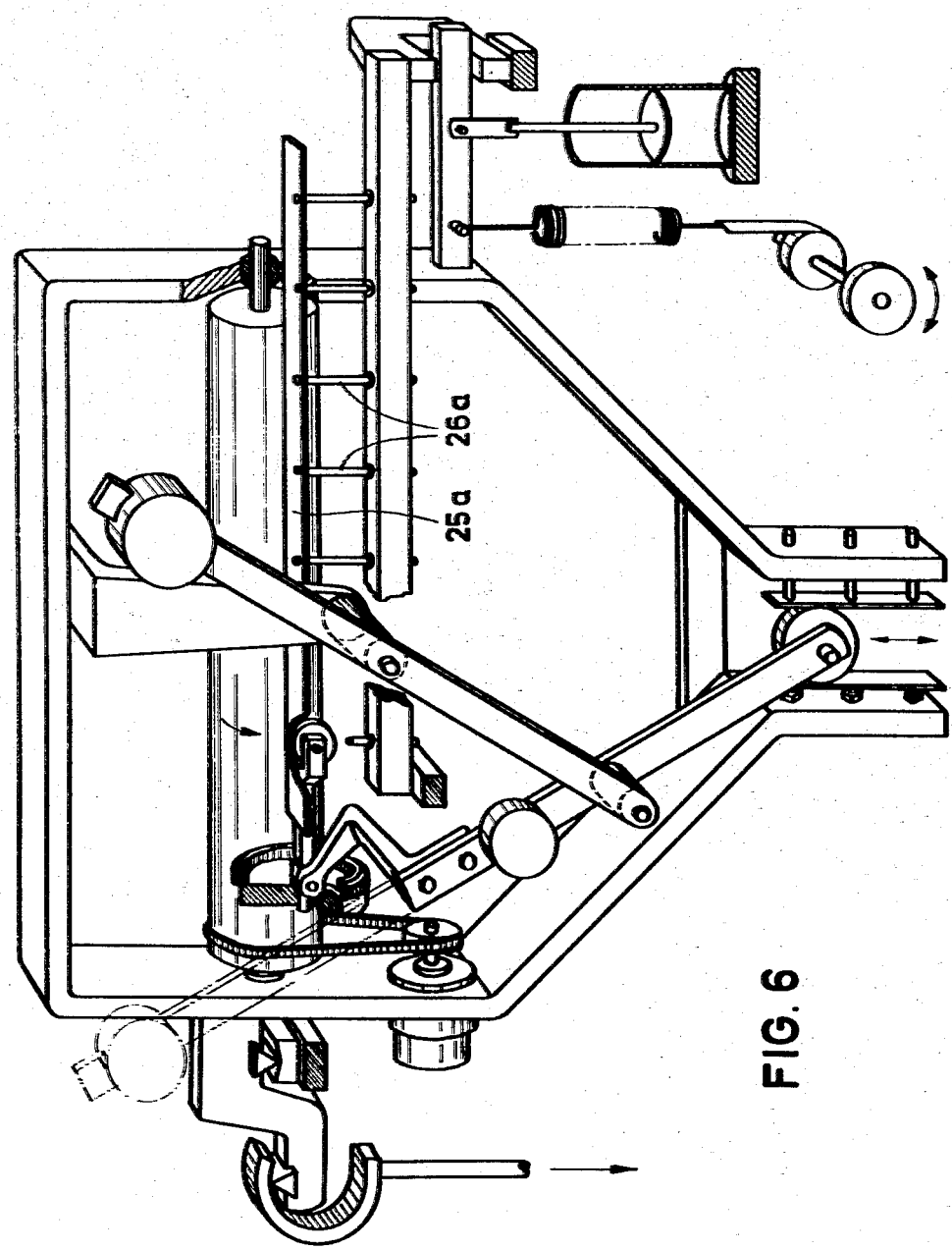
FIG. 6 is a view similar to that of FIG. 5 in which the control roller is in contact with the underside of the guide rail.

FIG. 6 illustrates a modification of the device of FIG. 5. The rail 25 supports a guide rail 25a through the intermediary of elongated adjusting screws 26a, the guide roller 24 rolling along the underside of guide rail 25a. This modification is preferred in practice.

With respect to the invention, the principle of a balance beam using a friction roller 6 and a friction element 21 in which the friction eelment 21 is guided in permanent contact with the friction roller in linear parallel relation thereto is already known. For this linear guidance of the friction roller, use has previously been made of a rectilinear rail on which a carriage can be driven to and fro by means of rollers. The friction roller is journaled on the carriage. The present invention is distinctive in that the rectilinear rail with the carriage is replaced by the lever system 11, 14 which has substantial advances as disclosed hereinbefore. Thus the present invention is characterized by the linkage mechanism by which absolutely linear movement of the friction element 21 is obtained when the beam 1 and the linkage mechanism undergo relative pivotal movement about axle 10.

What is claimed is:

1. An automatic dynamometer comprising a motor-driven friction means for adjusting a balance weight, said means including a first frictional member and a second frictional member in frictional contact with said first member and longitudinally displaceable with respect thereof and an articulated lever means supporting said second frictional member for providing substantially linear displacement thereof in proportion to the magnitude of load applied to the dynamometer.

2. A dynamometer as claimed in claim 1 comprising a beam frame for attachment of the force to be measured, said articulated lever means being mounted on said beam frame.

3. A dynamometer as claimed in claim 1 in which the articulated lever means is secured to a rigid foundation.

4. A dynamometer as claimed in claim 1 in which the articulated lever means includes members which are movable in one or more parallel planes.

5. A dynamometer as claimed in claim 1 in which the second frictional member is disposed vertically above the first frictional member.

6. A dynamometer comprising a motor-driven friction means for adjusting a balance weight and including at least two members in frictional contact one of which is displaceable in proportion to the applied load relative to a second of said friction members and a lever system connected to the displaceable frictional member and including a first pivotally mounted lever, and a second pivotal lever centrally connected to said first lever, said second pivotal lever having one end adapted to execute linear displacement and pivotably carrying said second friction member.

7. A dynamometer as claimed in claim 6, in which said lever system includes three pivots on said second lever, a first connecting the second lever and second friction member, a second connecting the second lever to the first lever and a third on the end of the second lever opposite the first pivot, means connected to said third pivot to limit displacement thereof along a rectilinear path, and a pivot for said first lever intermediate the ends thereof, the spacing between the three pivots on the second lever and between the pivot on the first lever and the second pivot of the second lever, being at least approximately equal.

8. A dynamometer as claimed in claim 7, in which the first lever comprises a balancing weight for balancing the first lever about the pivot thereof and a separate balancing weight on the second lever for separately balancing the same about its pivotal connection to the second friction member.

9. A dynamometer as claimed in claim 7 comprising a guide arm mounted on the second frictional member, a rail disposed parallel to the first frictional member, said guide arm having one end supported on said rail for displacement thereon, said means to limit displacement of the third pivot along a rectilinear path comprising at least one guide rail, the first said rail and guide rail including means for adjustment of the positions thereof.

10. A dynamometer as claimed in claim 6, in which the second lever includes a weight for balancing the second lever about the pivotal connection with the first lever, and a further weight on the first lever to balance both levers about the pivotal support of the first lever.

11. A dynamometer as claimed in claim 6 comprising a pivotal bearing for said second frictional member and a lever arm carrying said pivotal bearing of the second frictional member, said lever arm being pivotally mounted on said second lever.

References Cited

UNITED STATES PATENTS

| | | | |
|---|---|---|---|
| Re. 16,666 | 7/1927 | Hebden | 177—214X |
| 1,519,383 | 12/1924 | Merrick | 177—212 |

FOREIGN PATENTS

| | | | |
|---|---|---|---|
| 196,527 | 4/1923 | Great Britain | 177—213 |

CHARLES A. RUEHL, Primary Examiner

U.S. Cl. X.R.

177—212